United States Patent [19]

Covey, Jr.

[11] Patent Number: 4,611,567
[45] Date of Patent: Sep. 16, 1986

[54] VAPORIZER/CARBURETOR

[76] Inventor: Ray M. Covey, Jr., 2901 Penwood Dr., El Paso, Tex. 79936

[21] Appl. No.: 640,352

[22] Filed: Aug. 13, 1984

[51] Int. Cl.$^4$ .......................................... F02M 31/00
[52] U.S. Cl. ................... 123/545; 123/593; 123/557; 123/575
[58] Field of Search ............... 123/557, 546, 545, 552, 123/549, 525, DIG. 83, 23 A, 522, 523, 575, 578; 165/52; 261/144, 145, DIG. 83

[56] References Cited

U.S. PATENT DOCUMENTS

| | | | |
|---|---|---|---|
| 1,016,741 | 2/1912 | Fritz | 123/545 |
| 1,217,781 | 2/1917 | Lamb | 123/545 |
| 1,218,867 | 3/1917 | Johnson | 123/545 |
| 1,973,889 | 9/1934 | Timian | 123/545 |
| 2,139,777 | 12/1938 | Skok | 123/549 |
| 2,473,808 | 6/1949 | Mallory | 123/552 |
| 2,742,886 | 4/1956 | McPherson | 123/522 |
| 3,713,429 | 1/1973 | Dwyre | 123/522 |
| 3,762,378 | 10/1973 | Bitonti | 123/549 |
| 3,814,071 | 6/1974 | Buchwald | 123/552 |
| 3,924,591 | 12/1975 | Bond | 123/552 |
| 3,930,478 | 1/1976 | Brettshneider | 123/552 |
| 4,044,741 | 8/1977 | Swingley | 123/545 |
| 4,044,742 | 8/1977 | Linden | 123/549 |
| 4,047,512 | 9/1977 | Hough | 123/552 |
| 4,062,334 | 12/1977 | Toda | 123/579 |
| 4,072,138 | 2/1978 | Hawkins | 123/552 |
| 4,086,893 | 5/1978 | Bernecker | 123/549 |
| 4,151,821 | 5/1979 | Wichman | 261/145 |
| 4,196,710 | 4/1980 | Lehar | 123/523 |
| 4,423,716 | 1/1984 | Glass | 123/549 |
| 4,425,898 | 1/1984 | McLean | 123/525 |

FOREIGN PATENT DOCUMENTS 192311  2/1923  United Kingdom ............... 261/144

Primary Examiner—Ronald H. Lazarus
Attorney, Agent, or Firm—Paul H. Gallagher

[57] ABSTRACT

A vaporizer unit has an enclosing casing including a plurality of tubes therein, defining a fuel passage therethrough, including the tubes. The tubes have coiled wire screen therein. An auxiliary carburetor is positioned at the inlet end of the fuel passage, and an outlet passage leads to the main carburetor of the automobile. The casing also defines an exhaust passage therethrough, transversely of the fuel passage, providing heat transfer between the exhaust gases and the tubes. The temperature of the resulting vaporized fuel is sensed for varying the flow of the exhaust gases and thereby controlling the temperature of the vaporized fuel, which is maintained at 250° F. to 260° F. An electric crystal is used for breaking down the heavy ends of the fuel. The rate of flow of air to the main carburetor is varied for correspondingly varying the rate of intake of vaporized fuel from the vaporizer unit. Automatic and manual controls are both utilized selectively, each without interfering with the other.

5 Claims, 8 Drawing Figures

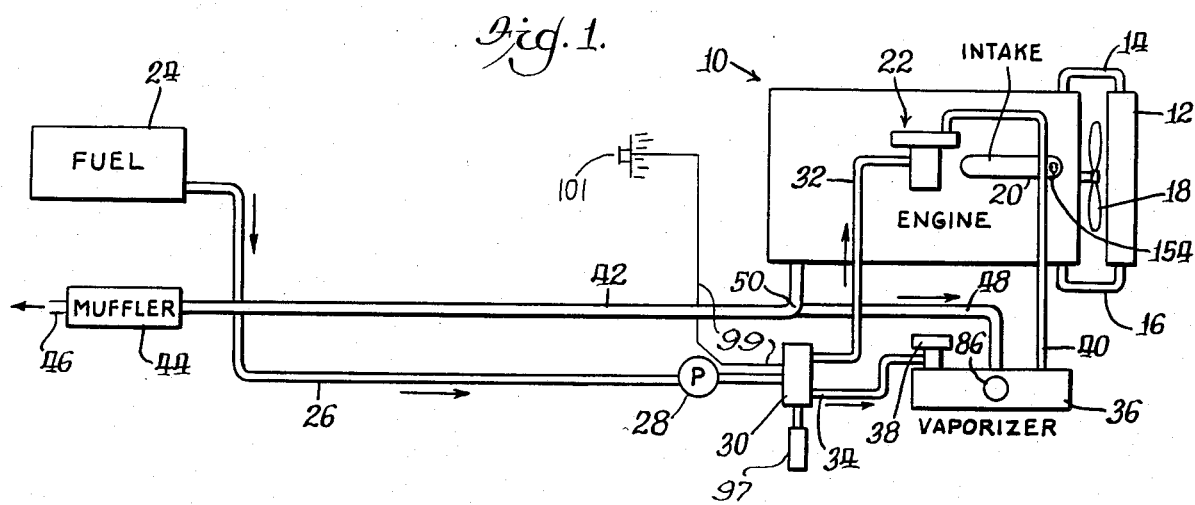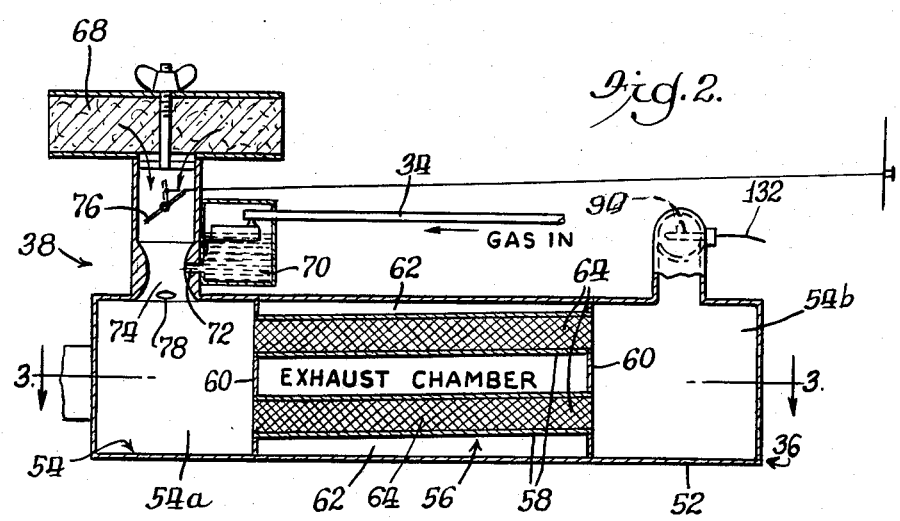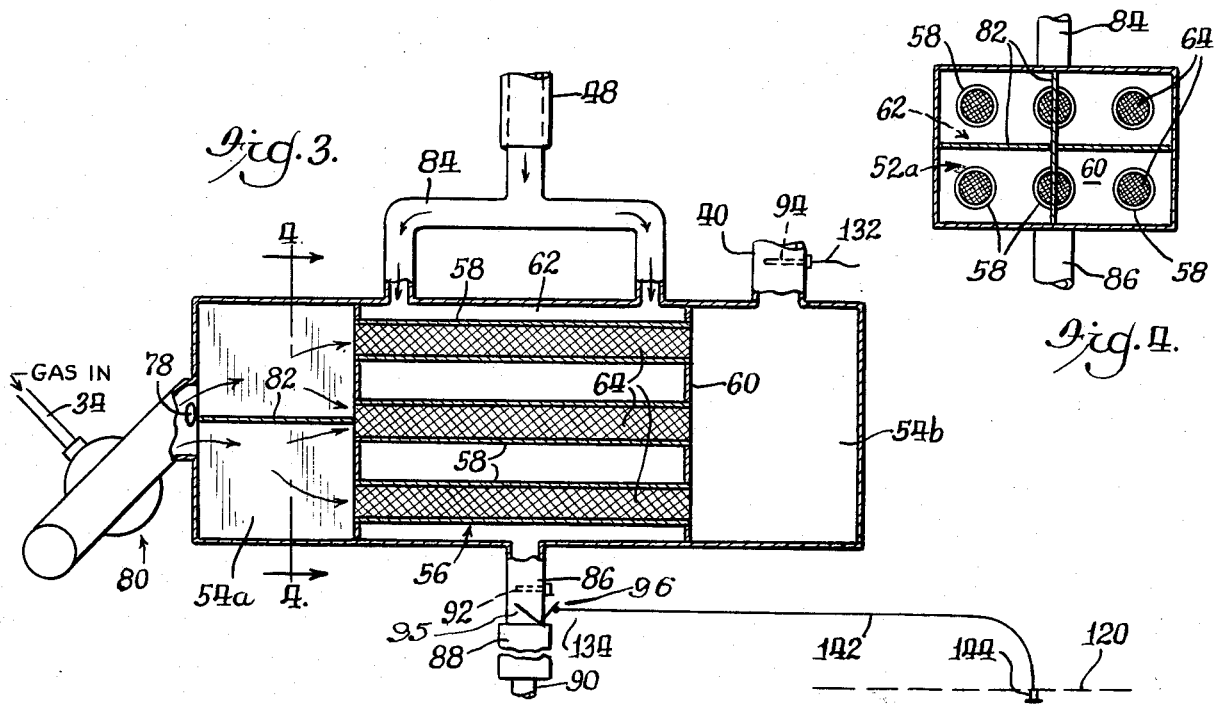

VAPORIZER/CARBURETOR

FIELD OF THE INVENTION

The invention resides in the general field of vaporizing liquid petroleum fuel for internal combustion engines, the most common example of which is in the case of automobiles.

OBJECTS OF THE INVENTION

A broad object of the invention is to provide apparatus and method in connection therewith, for vaporizing fuel, forming a complete and unified unit specially adapted for application to an engine, without requirement for predesigning the engine for that purpose.

Another object is to provide the foregoing apparatus, having the following features and advantages:

1. It includes a novel vaporizer unit especially effective for performing the vaporizing step.
2. It maintains the temperature of the vapor produced at such level as to provide most efficient combustion.
3. It provides a vaporizing step and produces the vapor in such quantity as to provide sufficient fuel for the engine in all instances, such as and particularly at high speeds and in climbing hills.
4. The apparatus is extremely simple in manufacture and in applying it to the engine, and effective in utilizing the facilities of the engine in the operation thereof.

DESCRIPTION OF A PREFERRED EMBODIMENT

In the drawings,

FIG. 1 is a diagrammatic view of the engine of an automobile and related components, and the apparatus of the present invention applied thereto;

FIG. 2 is a vertical longitudinal sectional view of the vaporizer unit of the invention, oriented according to FIG. 1;

FIG. 3 is a view taken at line 3—3 of FIG. 2;

FIG. 4 is a view taken at line 4—4 of FIG. 3;

Figure 5:
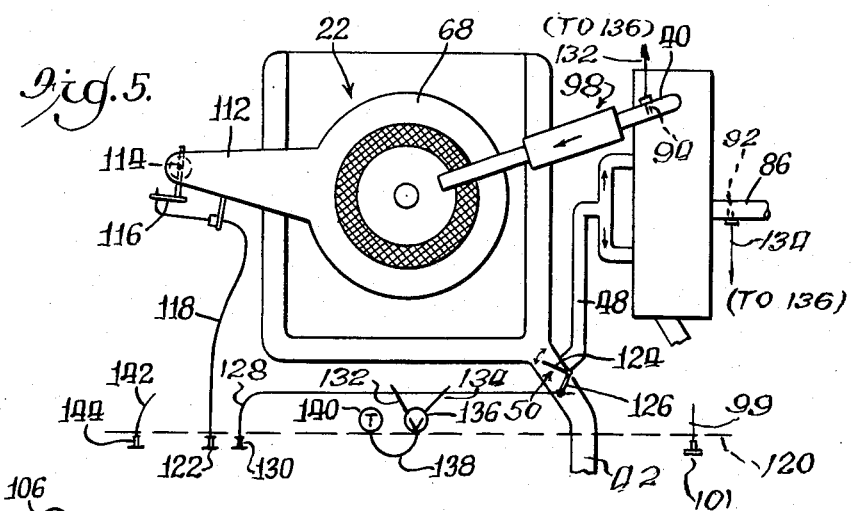
FIG. 5 is a semi-diagrammatic view of the automobile engine and the fuel intake through the air cleaner, and related elements.

Referring in detail to the accompanying drawings, attention is directed first to FIG. 1 where the automobile engine is indicated at 10, having the usual radiator 12 included in a coolant system including lines 14, 16, and the usual cooling fan 18.

The engine 10 includes an intake manifold 20 in which the vacuum is sensed for performing certain operations referred to hereinbelow. The engine includes a main carburetor 22 and the usual fuel tank 24 from which the fuel is drawn through a main fuel line 26 in which is a fuel pump 28. The main fuel line 26 continues to a two-way valve 30 and from this valve leads a first branch fuel line 32 leading to the main carburetor 22, and a second branch fuel line 34 leading to the vaporizer unit 36, this unit constituting a principal component of the invention. The valve 30 as will be explained hereinbelow is operative for directing the fuel selectively through the branch lines 32, 34 and thus to the main carburetor 22 and the vaporizer unit 36 respectively in accordance with a certain sequence of operations referred hereinbelow. The vaporizer unit 36 includes an auxiliary carburetor 38 into which the second branch fuel line 34 leads. A vapor outlet line 40 leads from the vaporizer unit 36 to the main carburetor 22.

The engine 10 includes the usual exhaust pipe 42 in which a muffler 44 is included, and an exit tail pipe 46. A branch exhaust pipe 48 leads from the main exhaust pipe 42 at a juncture 50, leading to the vaporizer unit 36.

Attention is next directed to FIGS. 2, 3 and 4 showing the details of the vaporizer unit 36. The vaporizer unit includes an outer casing or shell 52 having a main chamber 54 therein, divided into two end chambers 54a and 54b by a tube structure 56 which includes a plurality of tubes 58, in this case six, leading between the chambers 54a, 54b. These tubes are mounted in end plates 60 which enclose the space 62 surrounding the tubes. The two end spaces 54a, 54b, and the tubes, constitute a fuel passage through the unit, and the space 62 constitutes a transverse exhaust gas passage through the unit. The exhaust gases in that exhaust passage are in heat transfer relation to the tubes, for heating the fuel passing through the tubes, and vaporizing the fuel.

Preferably mesh elements 64 are placed in the tubes 58 these mesh elements being for example screen wire rolled into spirals and fitted into the tubes. The mesh units provide substantial open space for the fuel to pass therethrough, but the elements of the mesh also provide a great surface area for the particles of the atomized fuel to engage, greatly assisting the vaporization of the fuel. The fuel stream at this location is a mixture of atomized liquid fuel mixed in and carried by an air stream, produced by the auxiliary carburetor 38 and the engagement of the fuel particles with the elements of the screen mesh, provide a dwell in the passage of the fuel therethrough, with greater effectiveness in vaporizing it. The vaporizer unit 36 normally assumes a position adjacent the horizontal, in the normal operation of the automobile, despite travel on inclines, and the structure is such that the tubes 58 are inclined downwardly in direction opposite the direction of flow of fuel. In this instance (FIG. 2) the fuel flows generally from left to right, and the left ends of the tubes are lower than the right ends, enabling any liquid fuel that has not been vaporized to flow back, to be picked up by following increments of the air stream.

The auxiliary carburetor 38 of FIG. 2 is of known and standard type, having an air cleaner 68. The second branch fuel line 34 leads into a chamber 70 of the carburetor, from which the fuel then flows in atomized form through a nozzle 72 in the air passage 74 of the carburetor. A choke valve 76 is provided in the air passage, and manually set to a desired position.

An electric crystal 78 is mounted at the inlet from the carburetor, for vaporizing the heavy ends of the fuel, vibrating at a frequency of in the neighborhood of one million vibrations per second. This crystal is actuated by a 12 volt current, provided by the usual battery of the automobile.

The auxiliary carburetor 38 shown in FIGS. 1 and 2 has a vertical outlet, and is positioned on top of the vaporizer unit, but a side outlet carburetor may be utilized instead, such as the carburetor 80 of FIG. 3, having an outlet leading into the chamber 54a. In the construction of the vaporizer unit of FIG. 3, cross vanes 82 are placed in the space 54a for directing the fuel more effectively into the tubes 56. In FIG. 3 also, the electric crystal 78 is utilized. FIG. 3 is a transverse sectional view and shows the branch exhaust line 48 (FIG. 1) connected to a manifold 84 which leads into the transverse exhaust passage 62 and leading from the latter is an outlet pipe 86 which may be provided with a muffler 88 and leading to the exterior at 90. FIG. 3 also shows the outlet vapor tube 40 which leads from the chamber 54b to the main carburetor 22.

A temperature sensing element 92 is positioned in the outlet pipe 86 and another temperature sensing element 94 is positioned in the vapor outlet pipe 48, and a flapper exhaust control 95 is provided in the exhaust line 86, and moved by a lever 96, as referred to hereinbelow, these elements being utilized for controlling the temperature of the exhaust vapor. The two-way valve 30 (FIG. 1) includes a solenoid 97 for actuating it, this controlled through the sensing element 92 in a known manner, directing the fuel to the vaporizer unit upon the exhaust gases reaching a predetermined temperature. If desired, the valve may be controlled manually by a Boden wire 99 having a knob 101 at the dashboard.

Figure 6:
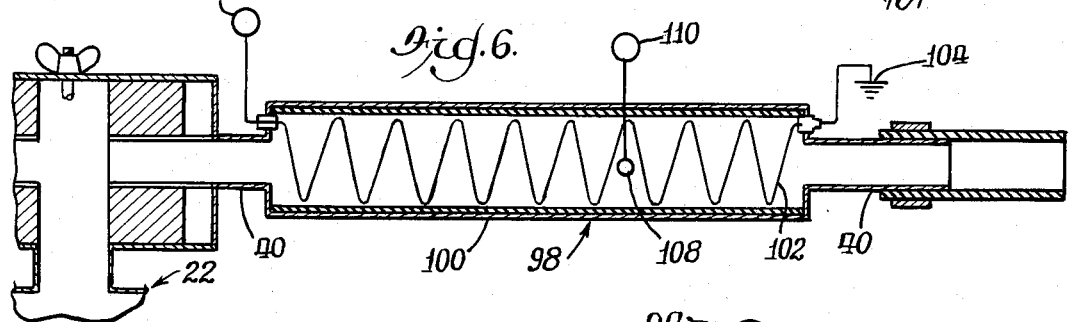
FIG. 6 is a longitudinal sectional view of a vapor tube electric heater included in FIG. 5.

FIGS. 5 and 6 show a vapor tube heater 98, for use in certain circumstances, such as in winter climates, for providing additional heat to the vaporized fuel, being placed in the vapor outlet line 40 between the vaporizer unit and the main carburetor 22. It includes an outer tubular casing 100 and a resistance heater element 102 therein, in an electrical circuit which includes a ground 104 and a thermostat 106. A temperature sensing element or probe 108 is positioned in the unit for sensing the temperature of the fuel vapor and connected with a temperature indicating gauge 110, the temperature gauge and thermostat being operably interconnected in a known manner, for varying the resistance of the element for controlling the temperature of the resulting fuel vapor.

FIG. 5 includes the main carburetor 22 and the air cleaner 68, the latter having an air inlet tube 112. The tube 112 has a choke valve 114 for varying the flow of the inlet air, this choke valve being operated by an arm 116 to which is connected a Boden cable 118 leading to the dashboard 120 and having a manual knob 122 thereon at that location. FIG. 5 also shows means for controlling the proportioned amount of exhaust gases flowing from the main exhaust pipe 42 (FIG. 1) to the branch exhaust pipe 48. At the juncture 50 of these lines is a flapper control valve 124 actuated by a lever 126, and leading from the lever is a Boden cable 128, continuing to the dashboard 120 where it is provided with a manual knob 130. These two manually actuated components may be provided in conjunction with automatically controlled components, as will be referred to hereinbelow.

FIG. 5 also shows the temperature probe 94 (FIG. 3) in the vapor outlet line 40, and the probe 92 in the outlet exhaust pipe 86, and wires 132, 134 leading from those probes to a two-way switch 136 on the dashboard 120, and an additional conductor 138 leading from the switch to a temperature indicating gauge 140 also on the dashboard. The operator may turn the switch to either of its two opposite positions, for observing the temperature of the vaporized fuel or the exhaust gases, respectively.

It is found that the best operating temperature of the vaporized gas is approximately 250° F., although it may be slightly higher than that, such as between 250° F. and 260° F. Upon observing the temperature of the vaporized fuel, by the temperature gauge 140 (FIG. 5) the driver may adjust, if need be, the passage of the outlet flow of exhaust gases through the pipe 86 (FIG. 3) by means of the flapper valve 95. A Boden wire 142 leads from the lever to the dashboard 120 where a manual knob 144 is affixed thereto.

Figure 7:
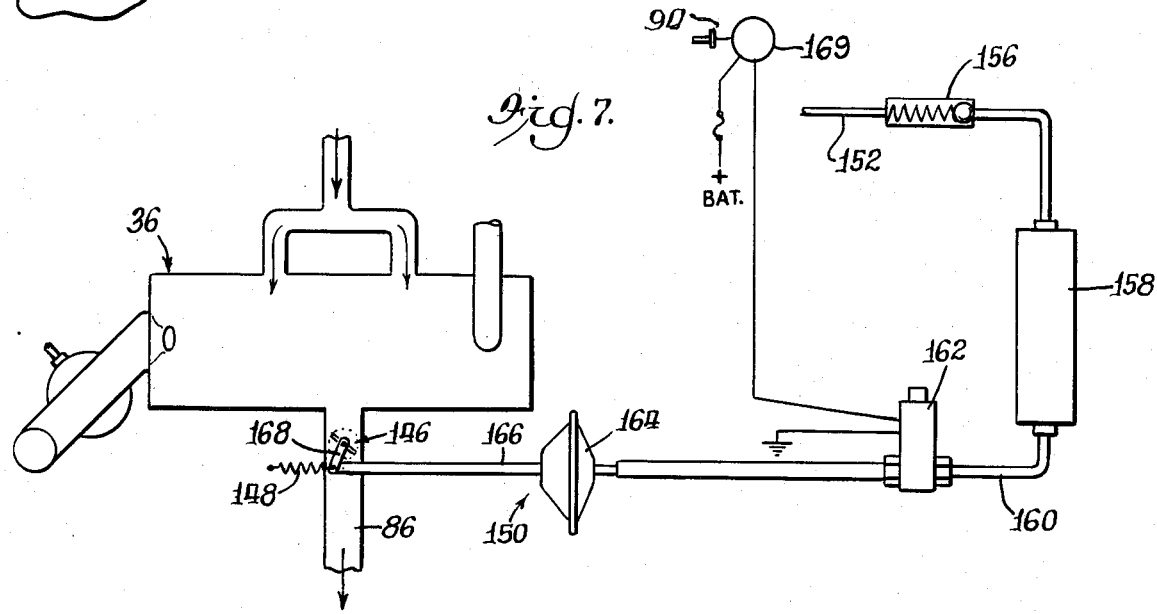
FIG. 7 is a diagrammatic view of an arrangement for controlling the temperature of the vapor.

FIG. 7 shows an arrangement for automatically controlling the temperature of the fuel vapor. This figure shows the vaporizer unit 36 including the outlet exhaust gas pipe 86. In this outlet pipe 86 is a choke control 146 biased to closed position by a tension spring 148, and it is moved in opening direction by a unit indicated in its entirety at 150. This unit includes a line 152 connected with the intake manifold 20 (FIG. 1) at 154, and in this line is a check valve 156, the line 152 leading to a vacuum unit 158. Leading from the unit 158 is an air line 160 which continues through an air control valve 162 and then to a vacuum motor 164 of known kind, having a diaphragm actuated by air pressure. Connected to the diaphragm is an actuating rod 166, itself connected with an arm 168 on the choke valve 146. The air control valve 162 is controlled by a thermostat 169 including the sensing element 94 (FIG. 3) in the vapor outlet line 40. Upon the temperature of the vaporized gas going above or below the predetermined values, as referred to above, the air control valve 162 is opened for controlling the vacuum condition which operates the motor 162. The vacuum in the engine, through the intake manifold, is transmitted through the line 152, releasing the check valve 156, producing a vacuum in the unit 158 which maintains a vacuum, or partial vacuum, at all times. Upon transmission of the vacuum from that unit through the line 160 as controlled by the air control unit 162, the vacuum is transmitted to the motor 164 and the external air pressure actuates the diaphragm of the motor, pulling the actuating rod 166 to the right, opening the choke control, that is, in response to a high vacuum, the motor is actuated a greater amount and opens the choke control and in response to a low vacuum the choke control closes or tends to close. This action may be start/stop or gradual as desired.

Figure 8:
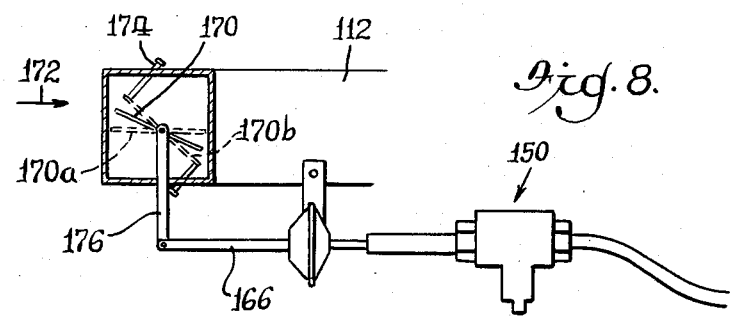
FIG. 8 is a semi-diagrammatic view of an automatic choke for controlling the flow of vapor to the main carburetor.

Attention is directed next to FIG. 8 which shows a portion of a device for automatically controlling the flow of air into the main carburetor. The tube or air arm 112 is provided with a second choke valve 170 for controlling the flow of air into the air cleaner which flows in the direction indicated by the arrow 172. It assumes a full open position as indicated at 170a which is adjacent the horizontal, and another position adjacent fully closed, is indicated at 170b, being limited in the latter direction by suitable means such as stop screws 174. Secured to the choke valve 170 is a lever arm 176, and secured to the latter is the actuating rod 166 of FIG. 7, of the unit 150, which is the same as that of FIG. 7. In the present case, FIG. 8, in response to high vacuum in the vacuum line 152, the choke valve is moved toward open position, and conversely, in response to low vacuum it is moved toward closed position. The operation of the arrangement is such that as the choke 170 is moved toward closed position, the air through the air cleaner and into the main carburetor is restricted, and as a consequence the draw on the vaporized fuel is greater. Hence this control means is effective for controlling the quantity of vaporized fuel to the engine, which is important in such cases as climbing steep hills.

As noted above, both manual control and automatic control may be utilized for performing the same functioning—for example the manual control of the choke valve 114 of FIG. 5 and the automatic control of FIG. 8, can both be utilized without interference with each other; similarly a manual control for the valve 94 (FIG. 3) for controlling the outlet exhaust vapor, and the automatic control of FIG. 7, can both be utilized for that function, without either interfering with the other.

I claim:

1. Vaporizer/carburetor apparatus for retrofitting with a self-contained internal combustion engine utilizing petroleum fuel and for use in conjunction with such fuel in liquid form, and including a main carburetor, the engine providing vacuum in its operation, and having an exhaust pipe for exhaust gases, and further including a fuel line and means for transmitting fuel from a supply through the line to a position adjacent the engine for use therein as stated more specifically hereinbelow, said apparatus comprising, a vaporizer unit including a casing having a fuel passage therethrough, and an exhaust passage therethrough, the passages having mutual heat exchange contact engagement, an auxiliary carburetor having a fuel inlet operably connected with the fuel line, and a fuel mixture outlet operably connected with the inlet portion of the fuel passage, the auxiliary carburetor including means for controlling the admixture therein of fuel and air and controlling the flow of the fuel mixture into the fuel passage, a vapor line leading from the outlet portion of the fuel passage to the main carburetor, valve means for controlling the rate of flow of exhaust gases through the exhaust gas passage in the unit, means for sensing the temperature of the vapor in the vapor line and correspondingly operating said valve means, and means responsive to the vacuum produced by the engine for enabling rate of flow of the exhaust gases through said casing in direct relation to change in vacuum, whereby to increase the temperature of the fuel and increase rate of flow of vapor also in direct relation to change in vacuum.

2. Apparatus according to claim 1 and including, valve means for selectively directing the fuel to the main carburetor and to the auxiliary carburetor.

3. Apparatus according to claim 1 wherein the main carburetor includes main control means for controlling the rate of fuel mixture outlet therefrom, and including means for controlling the rate of flow of fuel through the auxiliary carburetor, and apparatus pre-setting the rate of flow of external air to the main carburetor, and thereby controlling the proportion of fuel mixture from said vapor line.

4. Apparatus according to claim 1 and including, means responsive to the vacuum produced by the engine operable for reducing the flow of air into the main carburetor in proportion to increase in vacuum whereby to effect greater intake of air in the auxiliary carburetor and corresponding increase of fuel vapor.

5. Apparatus according to claim 1 wherein, the fuel passage includes a plurality of elongated tubes constituting a linear complete portion of the fuel passage, and mesh inserts in and substantially filling the tubes and extending continuously throughout the full length thereof, and the tubes being exposed to the exhaust gases in the exhaust gas passage through their full length.

* * * * *